(12) United States Patent
Ma et al.

(10) Patent No.: US 8,164,219 B2
(45) Date of Patent: Apr. 24, 2012

(54) PORTABLE ELECTRONIC DEVICE

(75) Inventors: Mou-Ming Ma, Taipei Hsien (TW);
Yi-Yuan Liu, Taipei Hsien (TW);
Chien-Chih Kao, Taipei Hsien (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 222 days.

(21) Appl. No.: 12/558,513

(22) Filed: Sep. 12, 2009

(65) Prior Publication Data
US 2011/0062783 A1 Mar. 17, 2011

(51) Int. Cl.
*H02J 9/00* (2006.01)
(52) U.S. Cl. .............................. 307/64; 307/66; 307/150
(58) Field of Classification Search ................ 307/150, 307/64, 66
See application file for complete search history.

(56) References Cited

U.S. PATENT DOCUMENTS

| 2004/0095712 A1* | 5/2004 | Chuang et al. ............... 361/679 |
| 2004/0178679 A1* | 9/2004 | Kabasawa ..................... 307/10.1 |
| 2009/0243542 A1* | 10/2009 | Chai et al. ..................... 320/112 |

* cited by examiner

*Primary Examiner* — Robert L. Deberadinis
(74) *Attorney, Agent, or Firm* — Chun-Ming Shih

(57) ABSTRACT

A portable electronic device includes a main body and a power supply module. The main body includes a main circuit, a power input port, and a housing. The housing defines a receiving space at a side surface thereof. The main circuit is disposed in the housing; the power input port is located on a wall surface of the receiving space and is connected to the main circuit. The power supply module includes a shell, a power output port formed on the shell, and a battery, a power modulating circuit and a switch received in the shell. The shell is capable of being detachably received in the receiving space of the housing, and when the shell is received in the receiving space the power output port is connected to the power input port on the wall surface of the receiving space. The power modulating circuit modulates alternating current to direct current suitable for the main circuit. The switch selectively connects the power output port to the battery or the power modulating circuit.

5 Claims, 4 Drawing Sheets

PORTABLE ELECTRONIC DEVICE

BACKGROUND

The present disclosure relates generally to portable electronic devices and particularly to portable electronic devices capable of automatically detecting whether there is available utility power and switching the power supplying mode accordingly.

Generally, the power supply of portable electronic devices (for example, notebook computers) is provided by batteries or power adapters which are capable of modulating utility power to direct current. However, batteries usually have limited capacity, and power adapters are usually additional accessories, which are inconvenient to carry.

Taiwan patent No. 595768 discloses a known alternating/direct power adapter for a portable computer, which includes a transformation rectifier and a battery pack. Accompanying with appropriate circuit design, this power adapter integrates a utility power supplier and a direct current supplier in one single adapter. However, this power adapter is still an accessory of the portable computer, and non-convenience of carrying has not been overcome.

BRIEF SUMMARY

In a portable electronic device according to the present disclosure, a power supply module having a battery and a power modulating circuit is detachably held on a main body of the portable electronic device. The power supply module further utilizes electronic or mechanical method to detect whether there is utility power supplied to the power modulating circuit and then automatically supply power using the battery or the power modulating circuit accordingly.

In one embodiment, the portable electronic device includes a main body and a power supply module. The main body includes a main circuit, a power input port, and a housing. The housing defines a receiving space at a side surface thereof. The main circuit is disposed in the housing; the power input port is located on a wall surface of the receiving space and is connected to the main circuit. The power supply module includes a shell, a power output port formed on the shell, and a battery, a power modulating circuit and a switch received in the shell. The shell is capable of being detachably received in the receiving space of the housing, and when the shell is received in the receiving space the power output port is connected to the power input port on the wall surface of the receiving space. The power modulating circuit modulates alternating current to direct current suitable for the main circuit. The switch selectively connects the power output port to the battery or the power modulating circuit.

In another embodiment, the portable electronic device further includes an electrical cable. A power output connector and a utility power plug are respectively formed on two ends of the electrical cable. The power output connector is configured for being plugged into a utility power input end on the shell to connect the electrical cable to the power modulating circuit. When the power output connector is plugged into the utility power input end on the shell the switch is driven by an interlinkage mechanism to connect the modulating circuit to the power output port. When the power output connector is pulled out of the utility power input end on the shell the switch is driven by the interlinkage mechanism to connect the power output port to the battery. Thus, the power supply module is capable of alternatively connecting the power output port to the battery or the power modulating circuit automatically. In other words, if the electrical cable is plugged in, the portable electronic device automatically utilizes the power form the power modulating circuit. In comparison, if the electrical cable is pulled out, the portable electronic device utilizes the battery to supply power.

In still another embodiment, the portable electronic device further includes a detecting circuit connected to the switch. The detecting circuit is used to replace the interlinkage mechanism in previous embodiment, and electronically detects whether there is alternating current supplied to the power modulating circuit so as to alternatively connecting the power output port to the battery or the power modulating circuit automatically. In detail, if an alternating current is detected to be supplied to the power modulating circuit, the detecting circuit sends a signal to control the switch to connect the power output port to the power modulating circuit. If no alternating current is detected to be supplied to the power modulating circuit, the detecting circuit sends a signal to control the switch to connect the power output port to the battery. As such, if connected to utility power, the portable electronic device automatically utilizes the power from the power modulating circuit. The portable electronic device sufficiently meets the requirements of humanized design.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
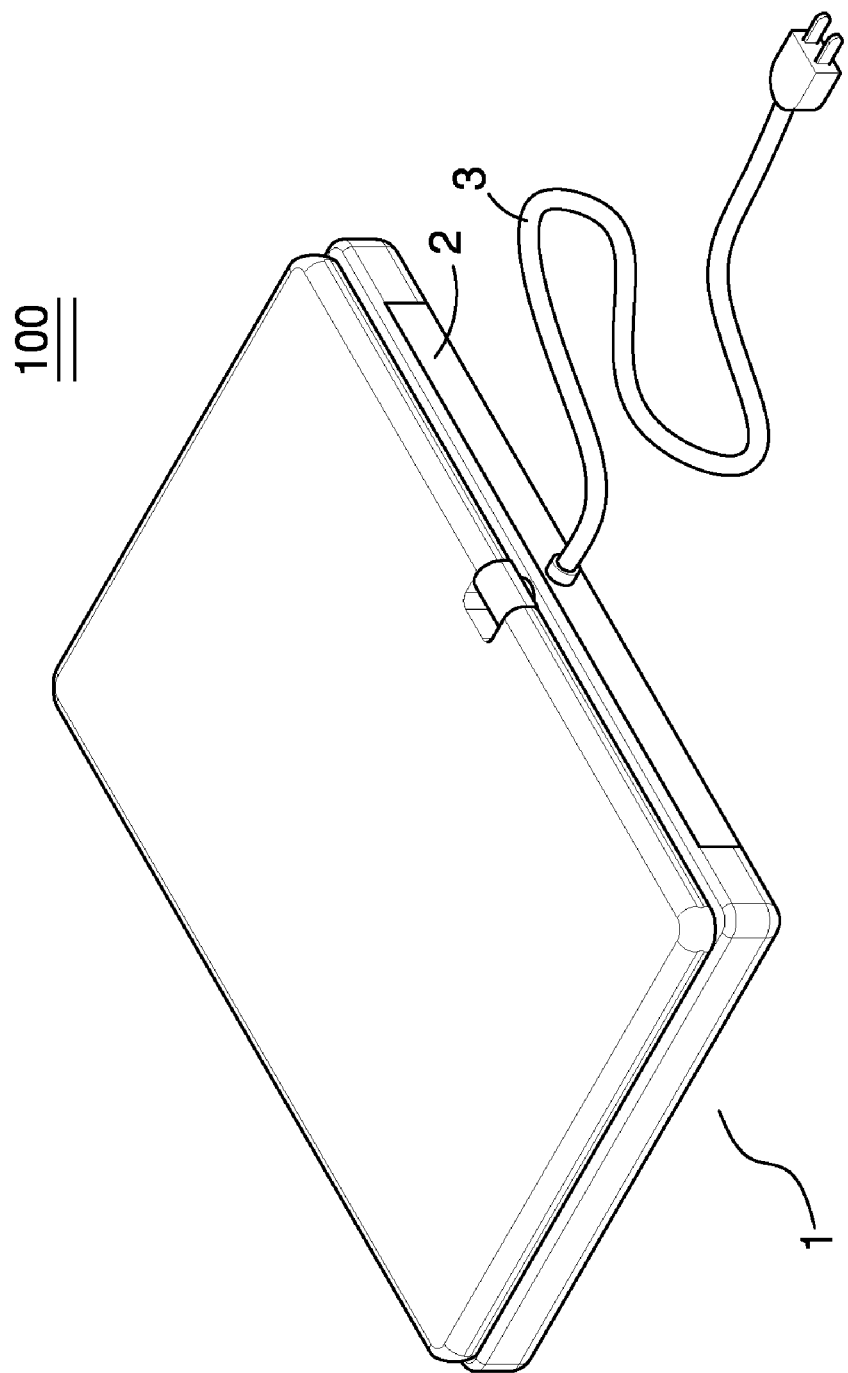
FIG. 1 is a schematic view illustrating a portable electronic device in accordance with an embodiment.

FIG. 1 illustrates a portable electronic device in accordance with an embodiment of the present disclosure, which includes a main body 1, a power supply module 2, and an electrical cable 3.

Figure 2:
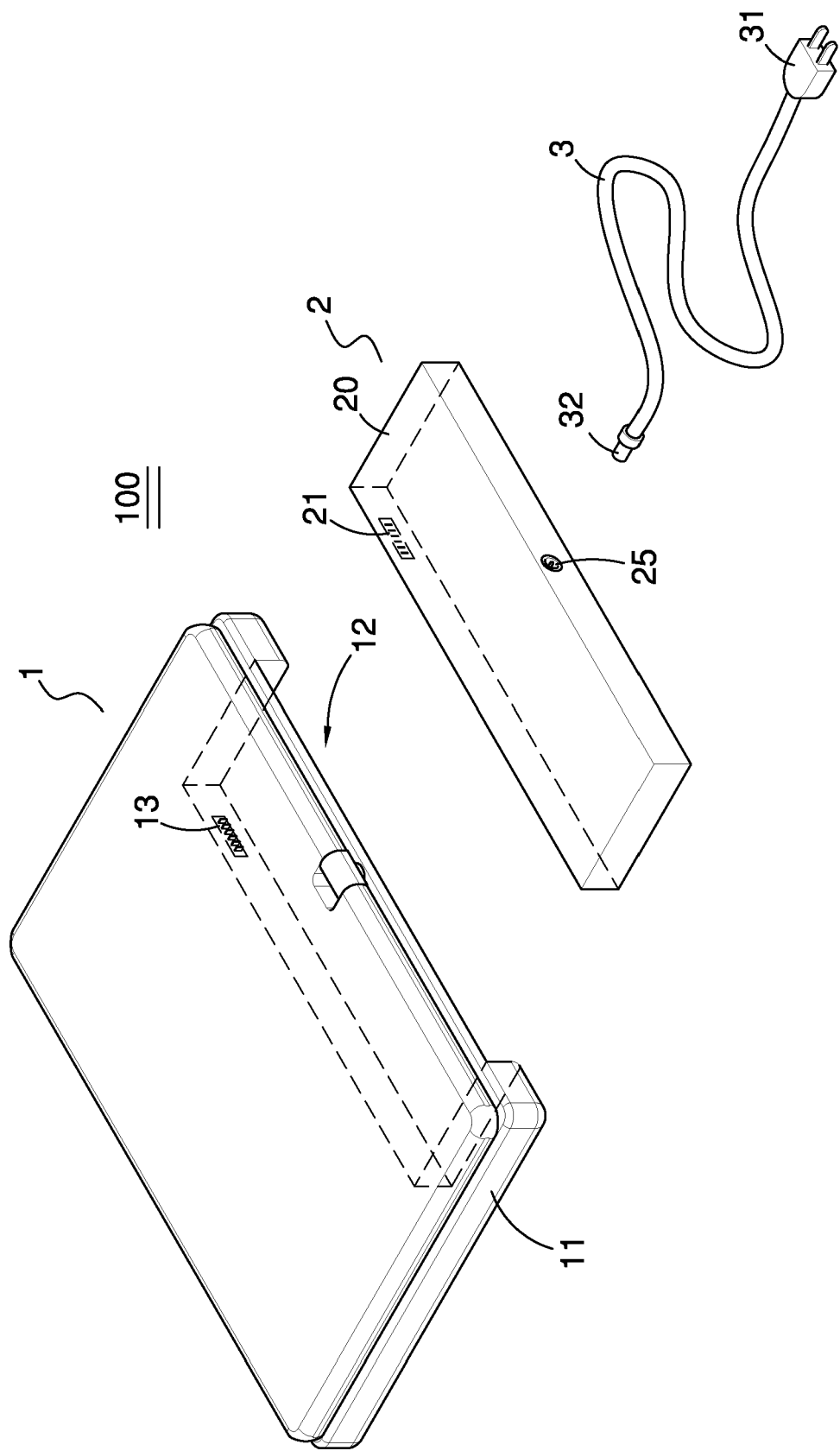
FIG. 2 is an exploded view of the portable electronic device of FIG. 1.
Figure 3:
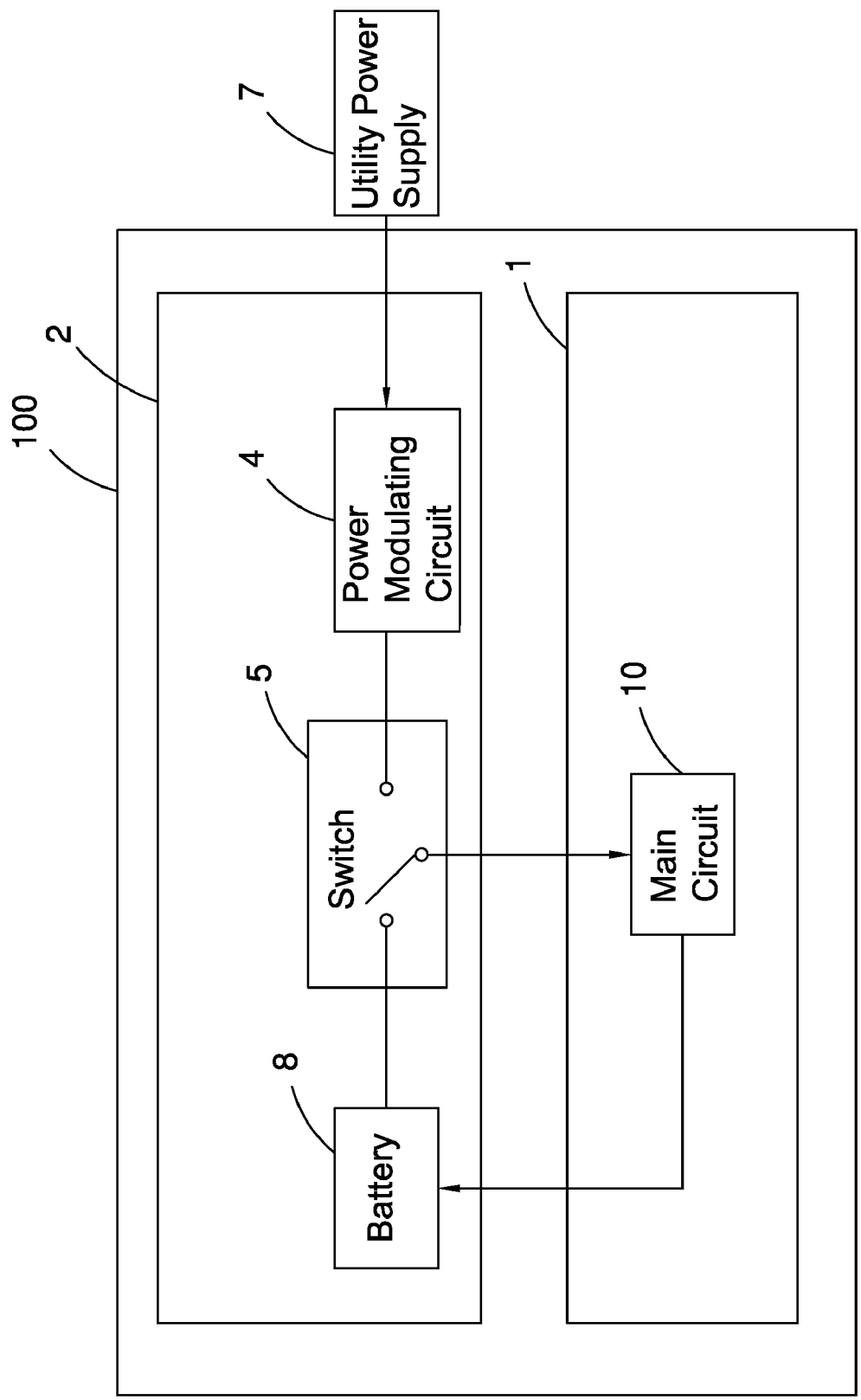
FIG. 3 is a circuit block diagram of the portable electronic device of FIG. 1.

Referring to FIGS. 2 and 3, the main body 1 includes a housing 11, a power input port 13, and a main circuit 10 disposed in the housing 11. The housing 11 defines a receiving space 12 at a side surface thereof. The power input port 13 is located on a wall surface of the receiving space 12, and is electrically connected to the main circuit 10.

As shown in FIG. 2, the power supply module 2 includes a shell 20, a power output port 21 installed on the shell 20, and a battery 8, a power modulating circuit 4, and a switch 5 (see FIG. 3) received in the shell 20. The shell 20 is detachably received in the receiving space 12 of the housing 11. The power modulating circuit 4 is configured for modulating alternating current (for example, utility power) to direct current suitable for the main circuit 10, and includes a power output end and a utility power input end 25. The utility power input end 25 is formed on the shell 20. In addition, one end of the switch 5 is electrically coupled to the power output port 21, and another end can be optionally coupled to the battery 8 or the power output end of the power modulating circuit 4. As such, the switch 5 is capable of alternatively connecting the battery 8 or the power modulating circuit 4 to the power output port 21.

Referring to FIGS. 2 and 3, a utility power plug 31 and a power output connector 32 are respectively formed at two opposite ends of the electrical cable 3. The utility power plug 31 is configured for connecting to a utility power supply 7, for example, an electrical outlet of indoor alternating power supply. The power output connector 32 can be connected to (for example, plugged into) the utility power input end 25 on the shell 20 to electrically connect the electrical cable 3 to the power modulating circuit 4.

In detail, when inserted into the power input end 25 of the power supply module 2, the power output connector 32 of the electrical cable 3 triggers an interlinkage mechanism (not shown) in the power input end 25, and then the interlinkage mechanism mechanically drives the switch 5 to disconnect the power output port 21 from the battery 8 and connect the power output port 21 to the power modulating circuit 4. In other words, the switch 5 electrically connects the power output port 21 and the power modulating circuit 4. In comparison, when the power output connector 32 is pulled out of the power input end 25, the switch electrically connects the power output port 21 to the battery 8.

As discussed above, once the power supply module 2 is totally installed into the receiving space 12 of the housing 11, the power output port 21 of the power supply module 2 is inserted into the power input port 13 in the wall surface of the receiving space 12. Additionally, as the power input port 13 is connected to the main circuit 10, thus the power supply module 2 is capable of supply power to the main circuit 10. At this time, if the power output connector 32 of the electrical cable 3 is plugged into the power input end 25, the switch 5 automatically connects the power modulating circuit 4 and the power output port 21. As such, the direct current from the power modulating circuit 4 can be conducted to the main circuit 10 of the main body 1. In comparison, if the electrical cable 3 is pulled off from the power input end 25, the switch automatically connects the main circuit 10 to the battery 8. In this condition, the battery 8 supplies power to the main circuit 10. In the present embodiment, whether there is available utility power can be automatically detected by plugging the electrical cable 3 and the interlinkage mechanism, and then the main circuit 10 can be selectively connected to the battery or the power supply module for power supply.

Figure 4:
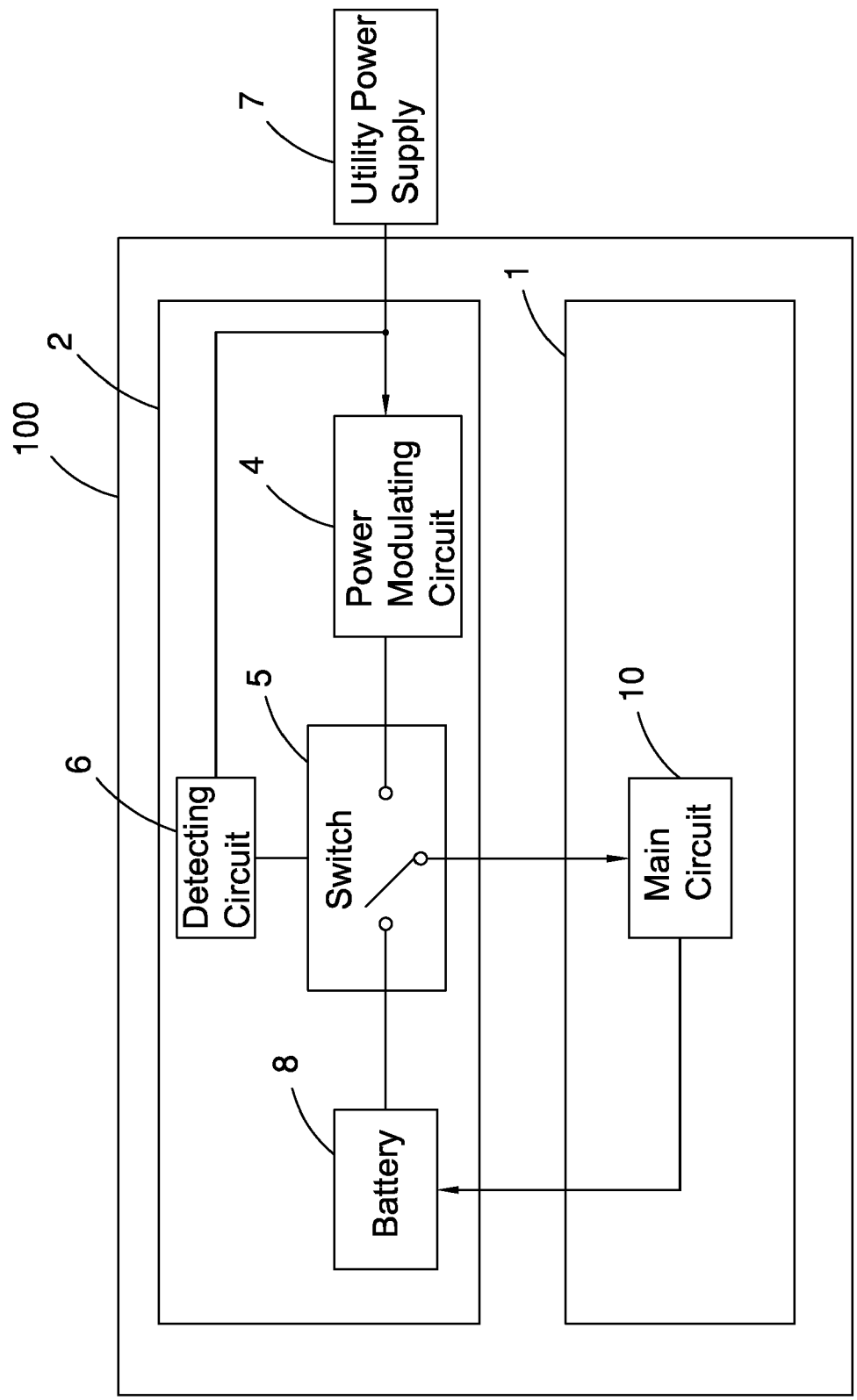
FIG. 4 is a circuit block diagram of a portable electronic device in accordance with another embodiment.

Referring to FIG. 4, which is illustrated, is another embodiment of the present disclosure. A portable electronic device in accordance with this embodiment is similar to that shown in FIGS. 1 to 3, except further including a detecting circuit 6 for detecting whether there is utility power supplied to the power modulating circuit 4. As such, the interlinkage mechanism can be omitted.

In the present embodiment, the detecting circuit 6 is connected to the switch 5, and is capable of detecting whether there is utility power supplied to the power modulating circuit 4. If an alternating current (for example, utility power) is detected to supplied to the power modulating circuit 4, the detecting circuit 6 sends a signal to control the switch 5 to connects the power output port 21 to the power modulating circuit 4. Similarly, if no alternating current (for example, utility power) is detected to supplied to the power modulating circuit 4, the detecting circuit 6 sends a signal to control the switch 5 to connects the power output port 21 to the battery 8. In other words, when two ends of the electrical cable 3 are respectively connected to the utility power supply 7 and the power input end 25 of the power supply module 2, the detecting circuit 6 detects the alternating current supplied to the power modulating circuit 4 and then sends a signal to control the switch 5 to connects the power output port 21 to the power modulating circuit 4. In comparison, when the electrical cable 3 is pulled out of the utility power supply 7 or the power input end 25, the detecting circuit 6 detects there is no alternating current supplied to the power modulating circuit 4 and then sends a signal to control the switch 5 to connects the power output port 21 to the battery 8. Structure and function of the main body 1, the power supply module 2, the electrical cable 3 and other elements of the present portable electronic device are discussed in the embodiment associated with FIGS. 1 to 3 and are not repeated here.

According to above description, it is understood that the portable electronic device of the present disclosure integrates detachably power supply module therein, and thus has an artistic appearance and convenience for carrying. In addition, the power supply module utilize electronic or mechanical method to detect whether there is utility power supplied to the power modulating circuit and then automatically switch appropriate power supply, which fully meets the requirements of humanized design.

The above description is given by way of example, and not limitation. Given the above disclosure, one skilled in the art could devise variations that are within the scope and spirit of the disclosure disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A portable electronic device, comprising:
    a main body including a main circuit, a power input port, and a housing, the housing defining a receiving space at a side surface thereof, the main circuit being disposed in the housing, the power input port being located on a wall surface of the receiving space and being connected to the main circuit; and
    a power supply module including a shell, a power output port formed on the shell, and a battery, a power modulating circuit and a switch received in the shell; the shell being capable of being detachably received in the receiving space of the housing, and when the shell is received in the receiving space the power output port is connected to the power input port on the wall surface of the receiving space; the power modulating circuit modulating alternating current to direct current suitable for the main circuit; the switch selectively connecting the power output port to the battery or the power modulating circuit;
    wherein, if an alternating current is supplied to the power modulating circuit, the power output port is connected to the power modulating circuit with the switch and the battery is charged; if no alternating current is supplied to the power modulating circuit, the power output port is connected to the battery and a direct current is supplied instead.

2. The portable electronic device of claim 1, further comprising a detecting circuit connected to the switch, and being capable of detecting whether there is alternating current supplied to the power modulating circuit; if an alternating current is detected to supplied to the power modulating circuit, the detecting circuit sends a signal to control the switch to connect the power output port to the power modulating circuit; if no alternating current is detected to supplied to the power modulating circuit, the detecting circuit sends a signal to control the switch to connect the power output port to the battery.

3. The portable electronic device of claim 1, further comprising an electrical cable, a power output connector and a utility power plug being respectively formed on two ends of the electrical cable; the power output connector being plugged into a utility power input end on the shell to connect the electrical cable to the power modulating circuit; when the power output connector is plugged into the utility power input end on the shell the switch connects the modulating circuit to the power output port; when the power output connector is pulled out of the utility power input end on the shell the switch connects the power output port to the battery.

4. A power supply module, comprising:
 a shell;
 a battery received in the shell;
 a power modulating circuit disposed in the shell and including a power output end and a utility power input end, the utility power input end being formed on the shell;
 a power output port formed on the shell;
 a switch received in the shell, one end of the switch being connected to the power output port and another end of the switch selectively connecting to the battery or the power output end of the power modulating circuit; and
 an electrical cable, a power output connector and a utility power plug being respectively formed on two ends of the electrical cable; the power output connector being configured for being plugged into the utility power input end on the shell; the utility power plug being configured for connecting to a utility power supply;
 wherein when the power output connector is plugged into the utility power input port on the shell, the switch connects the modulating circuit to the power output port, an alternating current is supplied and the battery is charged, or when the power output connector is pulled out of the utility power input end on the shell, the switch connects the power output port to the battery and a direct current is supplied instead.

5. The power supply module of claim 4, further comprising a detecting circuit connected to the switch, and being capable of detecting whether there is alternating current supplied to the power modulating circuit; if an alternating current is detected to supplied to the power modulating circuit, the detecting circuit sends a signal to control the switch to connect the power output port to the power modulating circuit; if no alternating current is detected to supplied to the power modulating circuit, the detecting circuit sends a signal to control the switch to connect the power output port to the battery.

* * * * *